United States Patent Office 3,371,060
Patented Feb. 27, 1968

3,371,060
ACETALS OF HYDROXY-CONTAINING VINYL POLYMERS AND FORMYLBENZENE SULFONAMIDES AND GELS THEREOF
Lloyd D. Taylor, Everett, and Maurice J. Fitzgerald, Canton, Mass., assignors to Polaroid Corporation, Cambridge, Mass., a corporation of Delaware
No Drawing. Continuation-in-part of application Ser. No. 482,583, Aug. 25, 1965. This application Aug. 1, 1966, Ser. No. 569,109
22 Claims. (Cl. 260—29.6)

ABSTRACT OF THE DISCLOSURE

This application discloses acetals of hydroxy-containing vinyl polymers and formylbenzenesulfonamides, including a class of such acetals which provides thermoreversible gels in aqueous alkaline solution.

---

This application is in part a continuation of our copending U.S. application Ser. No. 482,583, filed Aug. 25, 1965, and now abandoned.

One object of the present invention is to provide novel polysulfonamides.

Another object of the present invention is to provide novel thermoreversible gels comprising said polysulfonamides.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

The polymers of the present invention are acetals formed by condensing a vinyl polymer comprising recurring hydroxy-substituted segments with formylbenzenesulfonamides of the structure:

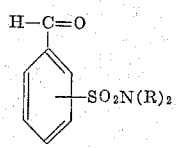

wherein each R may be a hydrogen, lower alkyl group, e.g., comprising less than six carbon atoms, a phenyl group or a 5- or 6-membered heterocyclic group, e.g., pyridyl, thiazolyl and benzimidazolyl group. In preferred embodiments, at least one R is a hydrogen, and in especially preferred embodiments both R's are hydrogen.

When R is an alkyl or phenyl group, such groups, if desired, may be substituted. As examples of suitable substituents which may be present, mention may be made of primary, secondary and tertiary amino groups, hydroxyl, mercapto, carboxyl, cyano, keto, alkylsulfonamido, halogenated alkyls, such as a trifluoromethyl group, and the halogens. The prefered hydroxy-substituted phenyl groups are the ortho- and para-dihydroxy-substituted compounds.

Formylbenzene sulfonamides for use in preparing the polymers of the present invention may be prepared by condensing a formylbenzene sulfonyl chloride with an amine of the structure NH(R$_2$) wherein R is the same as above. As examples of formylbenzene sulfonamides which can be used to prepare the polymers of the present invention, mention may be made of p-formylbenzene sulfonamide; m-formylbenzene sulfonamide; o-formylbenzene sulfonamide; N-butyl-p-formylbenzene sulfonamide; N-amyl-p-formylbenzene sulfonamide; N-methyl-p-formylbenzene sulfonamide; N-phenyl-p-formylbenzene sulfonamide; N,N-dimethyl-m-formylbenzene sulfonamide; N-(β-dimethylaminoethyl)-p-formylbenzene sulfonamide; N-(β-methyl-aminoethyl)-o-formylbenzene sulfonamide; N-(p-chlorophenyl)-p-formylbenzene sulfonamide; N-(β-chloroethyl)-o-formylbenzene sulfonamide; N-(3-pyridyl)-p-formylbenzene sulfonamide; N-(2-thiazolyl)-p-formylbenzene sulfonamide; N-(2,5-dihydroxyphenyl)-p-formylbenzene sulfonamide; N-(3,4-dihydroxyphenyl)-p-formylbenzene sulfonamide; N-(2-benzimidazolyl)-p-formylbenzene sulfonamide; N-(2-benzimidazolyl)-p-formylbenzene sulfonamide; N-(β-methylsulfonamidoethyl)-p-formylbenzene sulfonamide; N-(3-trifluoromethylphenyl)-p-formylbenzene sulfonamide; and N-(β-trifluoromethylsulfonamidoethyl - p - formylbenzene sulfonamide.

The preferred vinyl polymers for preparing the acetals of the present invention comprise recurring segments having at least two hydroxyl substituents thereon or recurring adjacent segments, each segment having at least one hydroxy substituent thereon. As examples of vinyl polymers which can be used in preparing the polymers of the invention, mention may be made of polymers comprising hydroxyethylene segments such as polyvinyl alcohol; polymers comprising hydroxymethylene segments such as polyhydroxy methylene (formed by hydrolyzing polyvinylene carbonate); the hydrolysis product of a copolymer of vinylacetate and vinylene carbonate i.e., a copolymer of vinyl alcohol and 1,2-dihydroxyethylene; copolymers of vinyl alcohol and α-trifluoromethylvinyl alcohol; and the hydrolysis product of a copolymer of α-trifluoromethylvinyl acetate and vinylene carbonate.

As examples of polymers within the scope of the present invention, mention may be made of:

(A) 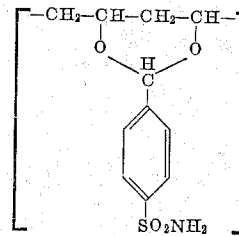

Acetal of polyvinyl alcohol and p-formylbenzene sulfonamide.

(B) 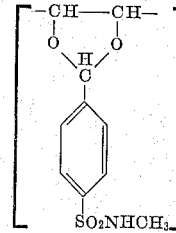

Acetal of polyhydroxymethylene and N-methyl-p-formylbenzene sulfonamide.

(C) 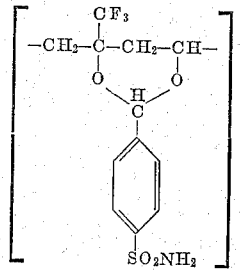

Acetal of a vinyl alcohol-trifluoromethylvinyl alcohol copolymer and p-formylbenzene sulfonamide.

(D)
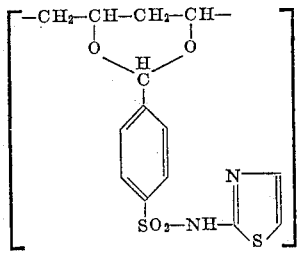

Acetal of polyvinyl alcohol and N-(2-thiazolyl)-p-formylbenzene sulfonamide.

(E)
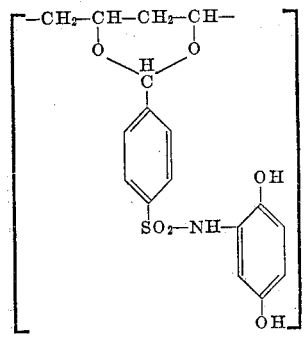

Acetal of polyvinyl alcohol and N-(2,5-dihydroxyphenyl)-p-formylbenzene sulfonamide.

(F)
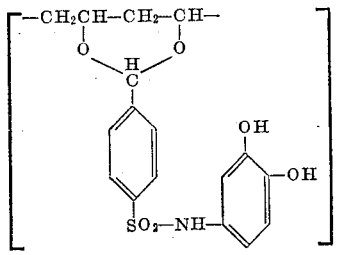

Acetal of polyvinyl alcohol and N-(3,4-dihydroxyphenyl)-p-formylbenzene sulfonamide.

(G)
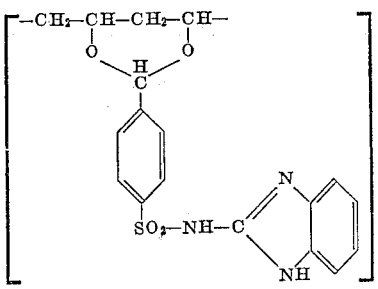

Acetal of polyvinyl alcohol and N-(2-benzimidazolyl)-p-formylbenzene sulfonamide.

(H)
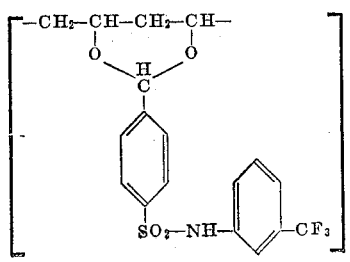

Acetal of polyvinyl alcohol and N-(3-trifluoromethylphenyl)-p-formylbenzene sulfonamide.

(I)
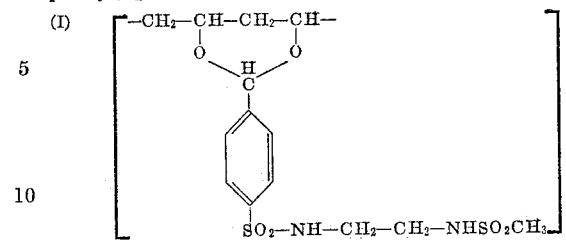

Acetal of polyinvyl alcohol and N-(β-methylsulfonamidoethyl)-p-formylbenzene sulfonamide.

(J)
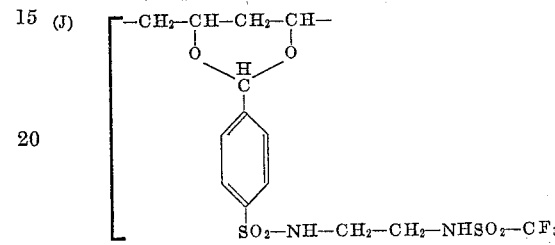

Acetal of polyvinyl alcohol and N-(β-trifluoromethysulfonamidoethyl)-p-formylbenzene sulfonamide.

(K)
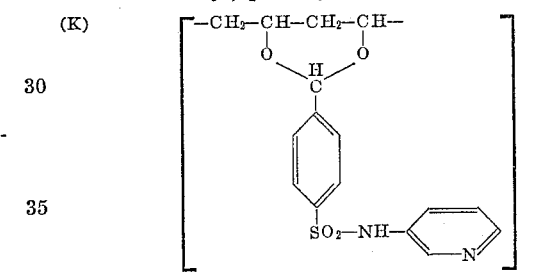

Acetal of polyvinyl alcohol and N-(3-pyridyl)-p-formylbenzene sulfonamide.

(L)
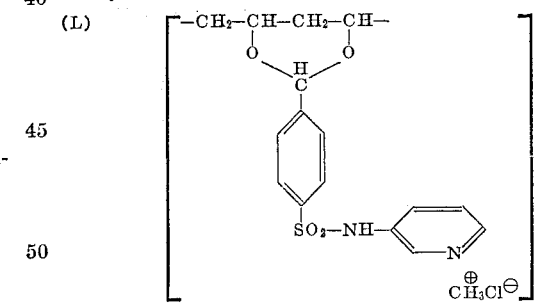

Methylchloride quaternary salt of an acetal of polyvinyl alcohol and N-(3-pyridyl)-p-formylbenzene sulfonamide.

Generally the amount of acetal groups substituted on the hydroxy-substituted polymers may be varied to suit particular needs. The polymers which were found particularly useful were those which had at least 5% of the hydroxy groups acetalized. Especially good results were obtained when 25 to 80% and more particularly 33 to 67% of the hydroxyl groups were acetalized.

The following nonlimiting examples illustrate the preparation of polymers within the scope of the present invention.

*Example 1*

14.0 gms. of polyvinyl alcohol (Elvanol 70–05) was dissolved with heat and stirring in 400 ml. glacial acetic acid. 19.6 gms. p-formylbenzene sulfonamide and 2 ml. of 85% phosphoric acid were added to the hot solution and the mixture was heated over a steam bath, with stirring, for about 18 hours. The supernatant liquid was decanted off and the resulting partial acetal of polyvinyl alcohol and p-formylbenzene sulfonamide was washed with acetone and dried under vacuum. The product proved to have a percent substitution equal to 67% of theoretical based upon combustion analyses for nitrogen and sulfur.

In the above preparation, phosphoric acid was used as the catalyst in the condensation step. It should be understood that any suitable mineral acid may be used, such as, for example, sulfuric, hydrochloric, etc.

*Example 2*

The procedure of Example 1 was repeated using 25.4 gms. of N-butyl-p-formylbenzene sulfonamide in place of the p-formylbenzene sulfonamide to provide an acetal of vinyl alcohol and said N-butyl-p-formylbenzene sulfonamide.

*Example 3*

50 gms. (0.137 mole) of polyvinyl alcohol (Elvanol 70-05) was dispersed in 50 ml. of glacial acetic acid and to it was added 10 gms. (.038 mole) of N-(3-pyridyl)-p-formylbenzene sulfonamide and 2 drops of sulfuric acid. The mixture was reacted overnight on a steam bath. The resulting acetal of polyvinyl alcohol and N-(3-pyridyl)-p-formylbenzene sulfonamide was precipitated into water and purified by reprecipitation from tetrahydrofuran into water. The yield was 10.8 gms.

When the acetals of the present invention comprise a pyridyl group such as in Example 3, the nitrogen atom of said pyridyl group may be quaternized by reacting it with known quaternizing agents such as methyl chloride and toluene sulfonate.

*Example 4*

7.2 gms. of polyvinyl alcohol (Elvanol 70-05) was dissolved in 130 ml. of glacial acetic acid and to it was added 14.0 gms. of N-(β-dimethylamino ethyl)-p-formylbenzene sulfonamide and 4 drops of sulfuric acid. The materials were reacted overnight on a steam bath and the resulting acetal was precipitated into water and then reprecipitated from methanol into acetone.

*Example 5*

5.35 gms. of a copolymer of vinyl alcohol and α-trifluoromethylvinyl alcohol was dissolved in 50 ml. of glacial acetic acid and to it was added 6.35 gms. of p-formylbenzene sulfonamide. The materials were reacted at 60° C. for six hours and the resulting acetal was precipitated into water. The acetal was washed with water and then with a 9:1 water-methanol solution and dried. The yield was 6.4 gms.

*Example 6*

A dispersion of 6.6 gms. (0.15 mole) polyvinyl alcohol, 10.0 gms. (0.05 mole) of N-methyl-p-formylbenzene sulfonamide and 5 drops of 85% phosphoric acid in 200 ml. of glacial acetic acid was refluxed on a steam bath for twenty hours. The resulting polymer was precipitated into water and reprecipitated from tetrahydrofuran into water. In the resulting acetal of polyvinyl alcohol and N-methyl-p-formylbenzene sulfonamide, about 54% of the available hydroxy groups were acetalized.

The acetals derived from the above-detailed reaction mixtures may contain some acetate groups due to direct esterification of the polymers' hydroxyl groups by the acetic acid solvent. Such acetate groups may be readily removed by dissolving the acetal in aqueous alkali and thus effecting hydrolysis of the ester groups. The resultant polymer may then be separated, from the solution, by neutralization of the solution with acid, preferably dilute acid.

The polymers of the present invention are useful as film-forming materials and in image-receiving layers for photographic black-and-white and color diffusion transfer processes, such as disclosed in U.S. Patent No. 2,983,606. They are further useful in the processes disclosed in copending application Ser. No. 482,620, filed Aug. 25, 1965.

An especially useful class of compounds in the present invention are those in which at least one R is a hydrogen and the second R is a hydrogen or a lower alkyl, i.e., three or less carbon atoms and, specifically, a methyl, ethyl or propyl group. It has been unexpectedly found that such polymers in aqueous alkaline solutions form thermoreversible gels. Such gels may be used as gelatin substitutes in many of the end uses in which gelatin has been used, e.g., carrier layers in photo-sensitive elements, image-receiving layers, silver halide binders, etc.

Usually the amount of polymer which may be used to form the thermoreversible gels may be varied to suit particular needs. Especially useful results have been obtained when the gels comprised at least 4% polymer and, more particularly, between about 4 to 10% polymer. Similarly, the amount of alkali may also be varied. Generally the use of about 4 to 10% alkali will provide useful gels. When desired, only sufficient alkali may be used to dissolve the polymer, and gel formation may be brought about through the addition of an electrolyte, e.g., a salt such as sodium chloride, sodium sulfate, etc.

The following nonlimiting examples illustrate the preparation of a thermoreversible gel within the scope of the present invention.

*Example 7*

10 gms. of the acetal of polyvinyl alcohol and p-formylbenzene sulfonamide produced in Example 1, was dissolved in 100 cc. of a 10% aqueous sodium hydroxide solution. A thermoreversible gel formed which melted at 50° C. The polymer precipitated out of solution when the pH was reduced below 9.

TABLE.—ADDITIONAL GELATION DATA FOR LAST-IDENTIFIED ACETAL

| Polymer Concentration (Percent) | NaOH Concentration (Percent) | Na$_2$SO$_4$ Concentration (Percent) | Melting Point of Gel (° C.) |
| --- | --- | --- | --- |
| 5 | 5 | | 8 |
| 5 | 10 | | 8 |
| 10 | 5 | | 10 |
| 10 | 2 | 10 | 55 |
| 10 | 5 | 1 | 19 |
| 10 | 5 | 2 | 25 |
| 10 | 5 | 3 | 33 |
| 10 | 5 | 4 | 36 |
| 10 | 5 | 5 | 40 |
| 10 | 5 | 6 | 48 |
| 10 | 5 | 7 | 51 |

*Example 8*

A gel was formed by dissolving 0.25 gm. of the acetal of polyvinyl alcohol and N-methyl-p-formylbenzene sulfonamide, produced in Example 6, in 6 ml. of water containing 0.5 gm. of sodium hydroxide. The resulting gel which comprised 4.2% polymer and 8.4% sodium hydroxide had a melting point of 42° C.

*Example 9*

A gel was made by preparing a 10% solution of the primary sulfonamide of Example 1 in 2% aqueous sodium hydroxide and then adding sodium chloride until a gel was formed. Gelation took place when about 8 to 10% sodium chloride had been added.

Since certain changes may be made in the above product without departing from the scope of the invention herein involved, it is intended that all matter contained in the above description shall be interpreted as illustrative and not in a limiting sense.

What is claimed is:

1. A thermoreversible gel, said gel comprising an aqueous alkaline solution of an acetal comprising the reaction product of a vinyl polymer containing recurring hydroxy-substituted segments with a formylbenzene sulfonamide of the structure:

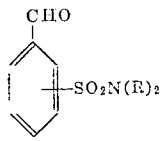

in which at least one R is hydrogen and the second R is selected from the group consisting of hydrogen and an alkyl group containing from 1 to 3 carbon atoms, inclusive.

2. A gel as defined in claim 1 wherein said second R is a methyl group.

3. A gel as defined in claim 1 wherein said second R is hydrogen.

4. A gel as defined in claim 1 wherein said vinyl polymer comprises recurring segments having at least two hydroxy substituents thereon.

5. A gel as defined in claim 1 wherein said vinyl polymer comprises recurring adjacent segments, each segment having at least one hydroxy substituent thereon.

6. A gel as defined in claim 1 including an electrolyte.

7. A gel as defined in claim 6 wherein said electrolyte is sodium sulfate.

8. A thermoreversible gel as defined in claim 1, said gel comprising an aqueous alkaline solution of an acetal of polyvinyl alcohol with a primary formylbenzene sulfonamide.

9. A thermoreversible gel as defined in claim 1 in which said aqueous alkaline solution comprises at least 4% of said acetal.

10. A thermoreversible gel as defined in claim 1 comprising an aqueous alkaline solution of an acetal of polyvinyl alcohol and an N-methyl-p-formylbenzene sulfonamide.

11. An acetal comprising the reaction product of a vinyl polymer containing recurring hydroxy-substituted segments with a formylbenzene sulfonamide of the structure:

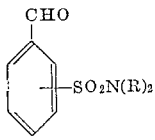

wherein each R may be selected from the group consisting of hydrogen, lower alkyl, phenyl and 5- and 6-membered heterocyclic groups.

12. An acetal as defined in claim 11 wherein at least one R is a hydrogen.

13. An acetal as defined in claim 12 wherein said vinyl polymer comprises recurring segments having at least two hydroxy substituents thereon.

14. An acetal as defined in claim 12 wherein said vinyl polymer comprises recurring adjacent segments, each segment having at least one hydroxy substituent thereon.

15. An acetal of a vinyl polymer as defined in claim 11 comprising recurring hydroxy-substituted segments and a primary formylbenzene sulfonamide.

16. An acetal as defined in claim 15 comprising polyvinyl alcohol and a primary formylbenzene sulfonamide.

17. A gel as defined in claim 8 wherein said formylbenzene sulfonamide is a para compound.

18. An acetal as defined in claim 16 wherein said formylbenzene sulfonamide is a para compound.

19. An acetal as defined in claim 11 wherein one R is a hydrogen, the second R is a lower alkyl and said lower alkyl is substituted by an amino group.

20. An acetal as defined in claim 11 wherein each R is a hydrogen.

21. An acetal as defined in claim 11 wherein one R is a hydrogen and the second R is a pyridyl group.

22. An acetal as defined in claim 21 in which the nitrogen atom of said pyridyl group is quaternized.

References Cited
UNITED STATES PATENTS 2,412,200   12/1946   Blum _____ 260—29.6

MURRAY TILLMAN, *Primary Examiner.*

W. J. BRIGGS, Sr., *Assistant Examiner.*